Sept. 11, 1951   C. D. VAN BIBBER   2,567,627
SHUTTER OPERATED FLASH SYNCHRONIZING SWITCH
AND ADJUSTABLE MOUNT THEREFOR
Filed Feb. 6, 1948

INVENTOR.
CHARLES D. VAN BIBBER,
BY
McMorrow, Berman & Davidson
ATTORNEYS.

Patented Sept. 11, 1951

2,567,627

UNITED STATES PATENT OFFICE 2,567,627

SHUTTER OPERATED FLASH SYNCHRONIZING SWITCH AND ADJUSTABLE MOUNT THEREFOR

Charles D. Van Bibber, Florence, Ala.

Application February 6, 1948, Serial No. 6,579

2 Claims. (Cl. 95—11.5)

This invention relates to improvements in devices for synchronizing the ignition of an electrical photoflash bulb with the opening of a camera shutter, the primary object of the invention being to provide a practical device of this character in the form of an accessory for use with front mounted camera shutters.

Another important object of the invention is the provision of a device of the above indicated character which can be mounted on the camera lens barrel in a quick and easy manner without marring parts of the camera. Another important object of the invention is to provide a small sized device of the character indicated above which can be used on miniature type cameras which do not afford sufficient room for more cumbersome types of synchronizing devices.

A further important object of the invention is the provision of a device of the above indicated character which can be synchronized at full shutter opening by observation, thereby eliminating need for testing devices for synchronizing purposes and enabling quick and reliable synchronization of the device.

A still further important object of the invention is the provision of a serviceable and mechanically efficient device of the above indicated character which is relatively simple and inexpensive in construction and adequate and reliable in operation for the purposes intended.

Other important objects and advantageous features of the invention will be apparent from the following description and accompanying drawings, wherein merely for present purposes of illustration, specific embodiments of the invention are set forth in detail.

Referring in detail to the drawings, wherein like numerals refer to like parts throughout the same, the numeral 10 generally designates a camera having a front mounted lens and shutter assembly 11, including the shutter housing 12 and the cylindrical lens barrel 13 projecting forwardly therefrom.

Figure 4:
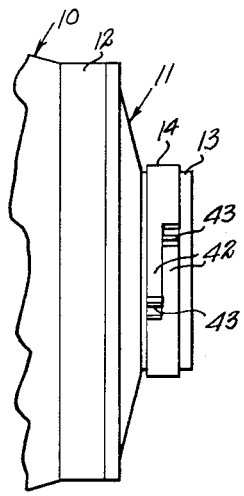
Figure 4 is a fragmentary right hand elevation of Figure 1.
Figure 5:
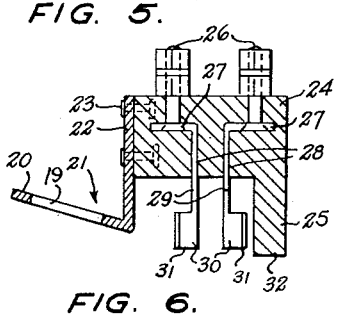
Figure 5 is an enlarged transverse section taken through the contact assembly shown in Figures 1 through 4.
Figure 6:
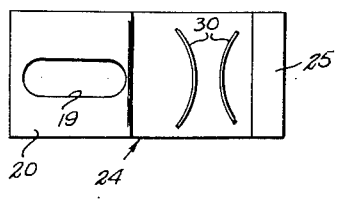
Figure 6 is a bottom plan view of Figure 5.

The device in accordance with the present invention shown in Figures 1 through 6 comprises a flat contractile split spring ring 14, adapted to be slipped over and to grip the lens barrel 13, having a lateral ear 15 to the outer end of which is hinged at 16 the radially inward end of a plate-like arm 17 in which is threaded a locking screw 18 which passes through a longitudinal slot 19 formed in one arm 20 of a plate-like V-shaped bracket 21, whose remaining arm 22 is secured by rivets 23 or other suitable means to the inner end of a generally rectangular insulated material block 24 of inverted L-shaped cross-section providing the rearwardly projecting wall or lug 25 at its outer end. A helical spring 16' is coiled on the hinge pin 17' and has oppositely-directed ends 18' and 19' overlying the ear 15 and the arm 17 so as to hold the arm 17 yieldably in place against the front of the shutter housing 12. The block 24 forms part of an electrical contact assembly which includes laterally spaced binding posts 26, 26 having portions embedded in or penetrating to the interior of the block and electrically engaged with oppositely laterally-directed portions 27, 27 on similar contact leaves 28, 28 which have flat shank portions 29, 29 exposed to the rear of the main body of the block alongside of the wall or lug 25. The shanks terminate in oppositely-curved arcuate portions 30, 30 whose free longitudinal edges 31, 31 lie protectively within the free edge 32 of the lug 25, as shown in Figure 5. The wires (not shown) leading from the photo flash bulb (not shown) with which the device is used are connected to the binding posts 26, 26.

Figure 1:
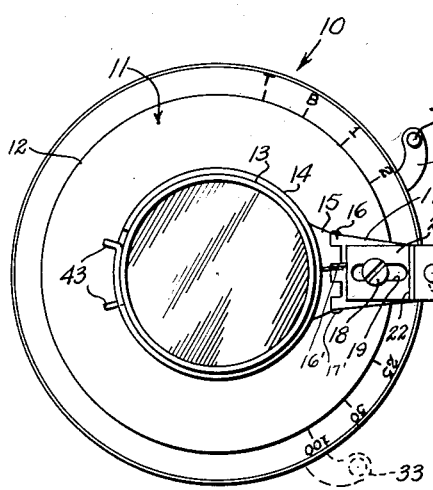
Figure 1 is a front elevation showing an embodiment of the invention in place on a front mounted camera shutter with the shutter cocking lever shown in starting position in full lines and in final position in dotted lines.
Figure 3:
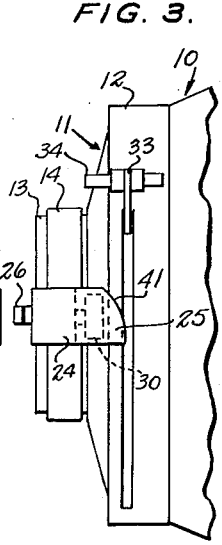
Figure 3 is a fragmentary left hand elevation of Figure 1.

The contact assembly is located at the side of the lens and shutter assembly, in this case the left-hand side thereof, at which the usual shutter cocking lever 33 projects, and which is arranged to be moved downwardly from the full line position shown in Figure 1 to the dotted line position shown therein for opening the shutter and exposing the film in the camera. The contact assembly is positioned at the point intermediate these two positions of the cocking lever 33 at which the camera shutter is in full open position, as can be visually determined, so that a conductive contact pin 34 secured in the outer end of the lever will pass between and electrically bridge the arcuate portions 30, 30 of the contact leaves and ignite the photo flash bulb at the exact instant that the camera shutter is fully open, thereby synchronizing the flash with the fully open condition of the shutter.

The slot 19 in the arm 20 of the bracket 21 enables adjusting the contact assembly radially with respect to the lens barrel 13 so that the cocking lever contact pin 34 will equally engage both contact leaf arcuate portions 30, 30 at the same time as the pin is carried therebetween by the operation of the lever. The hinged mounting of the bracket 21 enables the contact assembly to be swung forwardly out of the way when desired.

Figure 7:
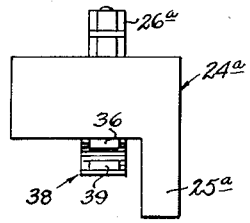
Figure 7 is a similarly enlarged side elevation of a modified form of contact assembly, and, Figure 8 is an inner end elevation of Figure 7.
Figure 8:
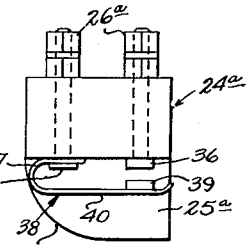

In Figures 7 and 8 is shown another embodiment of contact assembly comprising an insulated material block 24a similar to the block 24, with the binding posts 26a, 26a extended through the block and having heads 35 and 36 respectively, the head 36 acting as a contact point and the head 35 acting as an anchor for the crook portion 37 of a reclining U-shaped spring contactor 38, the free end of whose longitudinal portion has a contact point 39 opposed to but normally spaced from the contact point 36. The cocking lever pin 34 is adapted to engage and displace the longitudinal portion 40 of the contactor 38 as the lever is operated for opening the camera shutter, so as to engage the contact points 36 and 39 and close the flash bulb circuit in the fully open position of the shutter.

As in the case of the block 24, the corner of the lug 25a of the block 24a is rounded at the approach side thereof as indicated at 41, to enable the fingers of the operator of the cocking lever 33 to slide smoothly past the contact assembly as the lever is operated without closing the contacts and accidentally firing the flash bulb.

Figure 2:
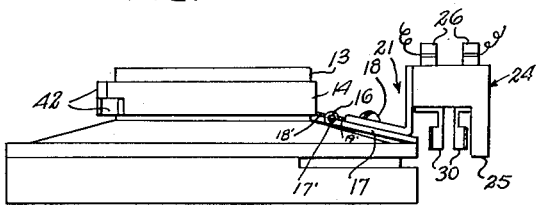
Figure 2 is a bottom plan view of Figure 1.

For maximum grip and stability on the lens barrel 13 the spring ring 14 may terminate at its ends in opposite offset overlapping spring fingers 42, which as shown in Figures 1, 2 and 4, have ears 43 facilitating expanding the ring for removal thereof from the lens barrel.

What is claimed is:

1. A photo flash synchronizer for a camera shutter and a lens assembly including a radially extending shutter cocking lever mounted on the shutter barrel of said assembly for circumferential movement from a starting position through an intermediate position corresponding to a fully open position for said shutter, and into a final position, said synchronizer comprising a split ring adapted to be circumposed about the lens barrel of said assembly and detachably secured thereto, an arm projecting radially outwardly of said ring at a point intermediate the starting and final positions of said lever and having one end pivotally supported on said ring to mount said arm for swinging movement toward and away from the shutter barrel of said assembly, an insulating block positioned contiguous to the other end of said arm and having one end fixedly secured thereto and having the other end terminating at a point spaced radially outwardly of said ring, a normally open circuit closing means including a pair of spaced contact leaves carried intermediate the ends of said block and transversely thereof adapted to be connected to a photoflash bulb to be fired, a projection adapted to be secured to said shutter cocking lever and engageable with said circuit closing means upon movement of said lever through said intermediate position, and means operatively connected to said arm for adjusting the length thereof to thereby facilitate movement of said contact leaves into a position wherein said projection passes through and bridges said leaves upon movement of said lever through said intermediate position.

2. A photo flash synchronizer for a camera shutter and a lens assembly including a radially extending shutter cocking lever mounted on the shutter barrel of said assembly for circumferential movement from a starting position through an intermediate position corresponding to a fully open position for said shutter, and into a final position, said synchronizer comprising a split ring adapted to be circumposed about the lens barrel of said assembly and detachably secured thereto, an arm projecting radially outwardly of said ring at a point intermediate the starting and final positions of said lever and having one end pivotally supported on said ring to mount said arm for swinging movement toward and away from the shutter barrel of said assembly, an insulating block positioned contiguous to the other end of said arm and having one end fixedly secured thereto and having the other end terminating at a point spaced radially outwardly of said ring, a normally open circuit closing means including a pair of spaced contact leaves carried intermediate the ends of said block and transversely thereof adapted to be connected to a photoflash bulb to be fired, a projection adapted to be secured to said shutter cocking lever and engageable with said circuit closing means upon movement of said lever through said intermediate position, means operatively connected to said arm for adjusting the length thereof to thereby facilitate movement of said contact leaves into a position wherein said projection passes through and bridges said leaves upon movement of said lever through said intermediate position, and resilient means operatively connected to said arm for biasing the latter into its position of movement toward said shutter barrel.

CHARLES D. VAN BIBBER.

REFERENCES CITED

The following references are of record in the file of this patent:

UNITED STATES PATENTS

| Number | Name | Date |
|---|---|---|
| 2,006,007 | Zimmer | June 25, 1935 |
| 2,020,741 | Rush | Nov. 12, 1935 |
| 2,049,735 | Grogin | Aug. 4, 1936 |
| 2,123,112 | Krueger | July 5, 1938 |
| 2,180,276 | Carroll | Nov. 14, 1939 |
| 2,234,150 | Van Duser | Mar. 4, 1941 |

FOREIGN PATENTS

| Number | Country | Date |
|---|---|---|
| 347,221 | Germany | Jan. 13, 1922 |
| 84,365 | Sweden | Sept. 17, 1935 |

OTHER REFERENCES

British Journal of Photography, pages 361 and 362, July 26, 1940, article by Jenkins, "Methods, Money and the Miniature." Copy in 95-11.5.